United States Patent [19]
Inoue et al.

[11] Patent Number: 5,455,867
[45] Date of Patent: Oct. 3, 1995

[54] SPEAKER APPARATUS AND TELEVISION RECEIVER USING THE SAME

[75] Inventors: Hideaki Inoue; Kiyoshi Ohhashi, both of Tsu; Asahiko Okada; Takashi Sabato, both of Matsusaka; Tomio Shiota, Takatsuki, all of Japan

[73] Assignee: Matsushita Electric Industrial Co., Ltd., Osaka, Japan

[21] Appl. No.: 153,186

[22] Filed: Nov. 17, 1993

[30] Foreign Application Priority Data

Nov. 18, 1992 [JP] Japan .................................. 4-308586
Nov. 18, 1992 [JP] Japan .................................. 4-308587
Feb. 9, 1993 [JP] Japan .................................. 5-020992

[51] Int. Cl.⁶ ............................. H04R 25/00; H04N 5/64
[52] U.S. Cl. ................... 381/154; 381/86; 381/24; 381/90; 381/158; 381/159; 181/156; 181/199
[58] Field of Search .................. 381/154, 86, 24, 381/87, 88, 90, 188, 205; 181/148, 151, 199; H04N 5/64

[56] References Cited

U.S. PATENT DOCUMENTS 3,881,074  4/1975  Kawamura .

FOREIGN PATENT DOCUMENTS

| 0361445 | 4/1990 | European Pat. Off. . |
| 0451991 | 10/1991 | European Pat. Off. .............. 381/85 |
| 1049500 | 2/1989 | Japan . |
| 0024900 | 2/1991 | Japan ................................... 381/24 |

Primary Examiner—Curtis Kuntz
Assistant Examiner—Sinh Tran
Attorney, Agent, or Firm—Willian Brinks Hofer Gilson & Lione

[57] ABSTRACT

The speaker apparatus of the invention having a speaker for radiating sound waves, an acoustic pipe having a slender opening and a rectangular form, with the front opening joined to the outer wall side of a cathode-ray tube and inner wall side of a cabinet of television receiver, being disposed at the front side of the speaker, and a sound leading part composed of a hollow part surrounded between the outer wall side of the cathode-ray tube and the inner wall side of the cabinet, from the junction to the opening of the cabinet, for guiding the sound waves radiated from the acoustic pipe to the front side of the television receiver, thereby realizing acoustic reproduction of high sound quality and high sound pressure, when applied in the television receiver, in spite of small size and slim shape.

8 Claims, 4 Drawing Sheets 5,455,867

SPEAKER APPARATUS AND TELEVISION RECEIVER USING THE SAME

FIELD OF THE INVENTION

The present Invention relates to a speaker apparatus used audio-visual appliances represented by television receivers, and a television receiver using the same, and more particularly to a speaker apparatus useful in a television receiver of high sound quality and high image quality, and a television receiver using the same.

BACKGROUND OF THE INVENTION

An acoustic apparatus disposing a horn or an acoustic pipe before a speaker for leading the sound waves emitted by the speaker to an opening has been widely used hitherto because of the advantages as compared with the constitution without using horn or acoustic pipe, such as acquisition of high sound pressure output and radiation of sound waves In a specific direction.

In the television receiver Incorporating such speakers, an acoustic pipe mounting a speaker Is disposed along a cathode-ray tube for image display, and the television cabinet is located along the acoustic pipe, so that the television receiver is small and slim.

Inside the acoustic pipe, absorption members and reflection plates are disposed depending on the length and shape of the acoustic pipe, and the acoustic characteristic is improved.

In such apparatus, as a result of too much attention paid to the small and slim structure of the receiver, the area of the section and opening of the leading part for guiding the sound waves from the acoustic pipe is too narrow, which has influenced the acoustic quality and lowered the output sound pressure.

In an apparatus having a bass-reflex port for bass register for enhancing the bass register disposed closely to the acoustic pipe, interference of radiation sound wave from the acoustic pipe occurs, which has caused sound pressure frequency characteristics of extreme peak dip.

Besides, for the purpose of downsizing, the magnetic circuit of the speaker is too close to the cathode-ray tube, and the image is disturbed by the leakage magnetic flux from the magnetic circuit.

SUMMARY OF THE INVENTION

It is hence a primary object of the Invention to present a speaker apparatus useful for making small and slim a television receiver, and a television receiver using the same.

It is other object of the invention to present a speaker apparatus useful for output of high sound quality and high sound pressure, and a television receiver using the same.

It is another object of the Invention to present a speaker apparatus successfully reducing the weight without giving adverse effects on the picture quality by approach of a speaker magnetic circuit to a cathode-ray tube In the trend of small size and slim body of a television receiver, and a television receiver using the same.

A preferred embodiment of the invention comprises:
a speaker,
an acoustic pipe disposed at the front side of the speaker, the acoustic pipe having a slender rectangular opening end, with the opening end disposed as being suited to the shape of the space enclosed by the outer wall of a cathode-ray tube and the inner wall of a cabinet, and
a different acoustic pipe (hereinafter we call it a sound leading part 8) constituted with a space enclosed between the outer wall of the cathode-ray tube and the inner wall of the cabinet, from the opening end of the acoustic pipe to the front side of the cabinet.

Further objects and effects of the invention will be better understood and appreciated in the following detailed description.

DESCRIPTION OF THE PREFERRED EMBODIMENTS

Figure 1:
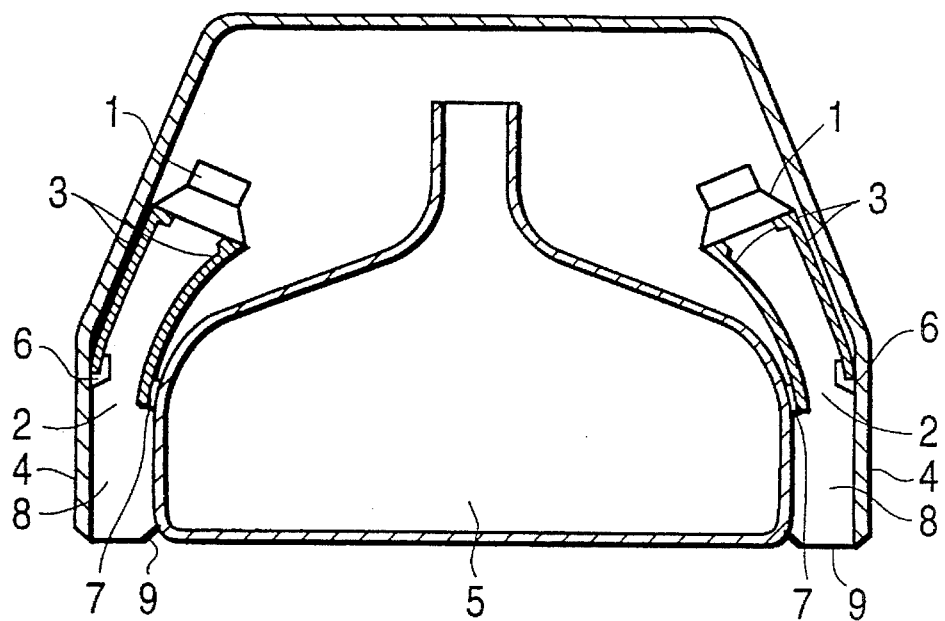
FIG. 1 is a plan sectional view of a television receiver incorporating a first embodiment of a speaker apparatus according to the invention.

Reference is first made to FIG. 1. The diagram shows a plan sectional view of a television receiver incorporating a first embodiment of a speaker apparatus according to the invention.

In FIG. 1, a speaker 1 for radiating sound waves, provided with an acoustic pipe 3 for guiding the sound waves toward the front end opening 2. The television receiver is represented, for the sake of simplicity of drawing, by a television cabinet 4 and a cathode-ray tube 5 disposed at its front side. The acoustic pipe 3 is joined to the television cabinet 4 near the front end opening 2 with the front end opening 2 disposed as being suited to the shape of the space enclosed by the outer wall of a cathod-ray tube and the inner wall of a cabinet, by a fitting rib 6, and a cushion material 7 is provided against the cathode-ray tube 5 as buffer means. A sound leading part 8 makes use of the hollow space between the television cabinet 4 and cathode-ray tube 5, and an opening 9 for the television receiver is provided at the front side.

Figure 2:
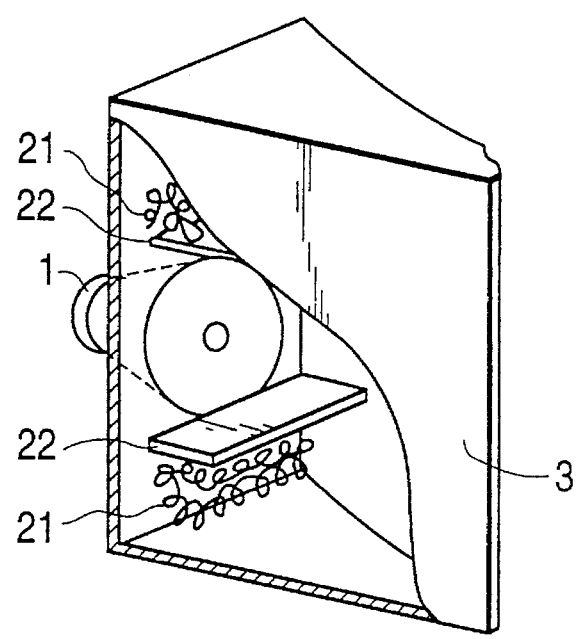
FIG. 2 is a partially magnified perspective view relating to the speaker and acoustic pipe in FIG. 1.

Refer to FIG. 2. This is a partly magnified view of the portion relating to the speaker 1 and acoustic pipe 3 in FIG. 1, and a sound absorption material 21 and a reflection plate 22 are shown.

By using the speaker apparatus of the invention as shown in FIG. 1 and FIG. 2, even in the television receiver having a slim opening 9 at the front surface of the receiver, since the hollow space surrounded by the cabinet 4 and cathode-ray tube 5 is utilized as the sound leading part 8 for guiding the sound waves radiated from the front end opening 2 of the acoustic pipe 3, the area of the opening 9 at the front face of the television receiver can be widened so that the sound waves may be distributed easily, and the sound quality of the speaker apparatus is enhanced, while the breadth of the television receiver may be made slimmer.

Besides, the sound absorbing material 21 and reflection plate 22 provided inside the acoustic pipe 3 can be disposed in consideration of the length of the sound leading part 8 and the internal structure of the acoustic pipe 3, and it is constituted to prevent propagation of sound waves along the outer wall of the cathode-ray tube 5 by disposing the cushion material 7 at the abutting areas of the front end opening 2 of the acoustic pipe 3 and the outer wall side of the cathode-ray tube 5, also to prevent propagation of sound waves along the inner wall of the cabinet 4 by joining the front end opening 2 of the acoustic pipe 3 and the inner wall side of the cabinet 4 through a fitting rib 6. Moreover, the junction by this fitting rib 6 acts to strengthen the rigidity of the cabinet 4, and the sound quality of the speaker apparatus may be further enhanced.

The sectional area of the sound leading part 8 is designed larger than the sectional area of the front end opening 2 of the acoustic pipe 3, and therefore the attenuation of sound waves radiated from the speaker 1 through the acoustic pipe 3 is very small, which also contributes to realization of high sound quality.

As described herein, in the speaker apparatus of the first embodiment and the television receiver using the same shown in FIG. 1, as, clear from the drawing, the acoustic pipe having a slender opening and a nearly rectangular section for guiding the sound waves is disposed at the front side of the speaker, the front end opening of the acoustic pipe is joined to the outer wall side of the cathode-ray tube and the inner wall side of the cabinet, and a large hollow part enclosed by the outer wall side of the cathode-ray tube and the inner side wall of the cabinet from the junction to the front opening of the cabinet is used as the bass register sound leading part of sound waves, so that the television receiver may be further reduced in size and thickness, while acoustic reproduction of high sound quality and high sound pressure is realized.

Figure 3:
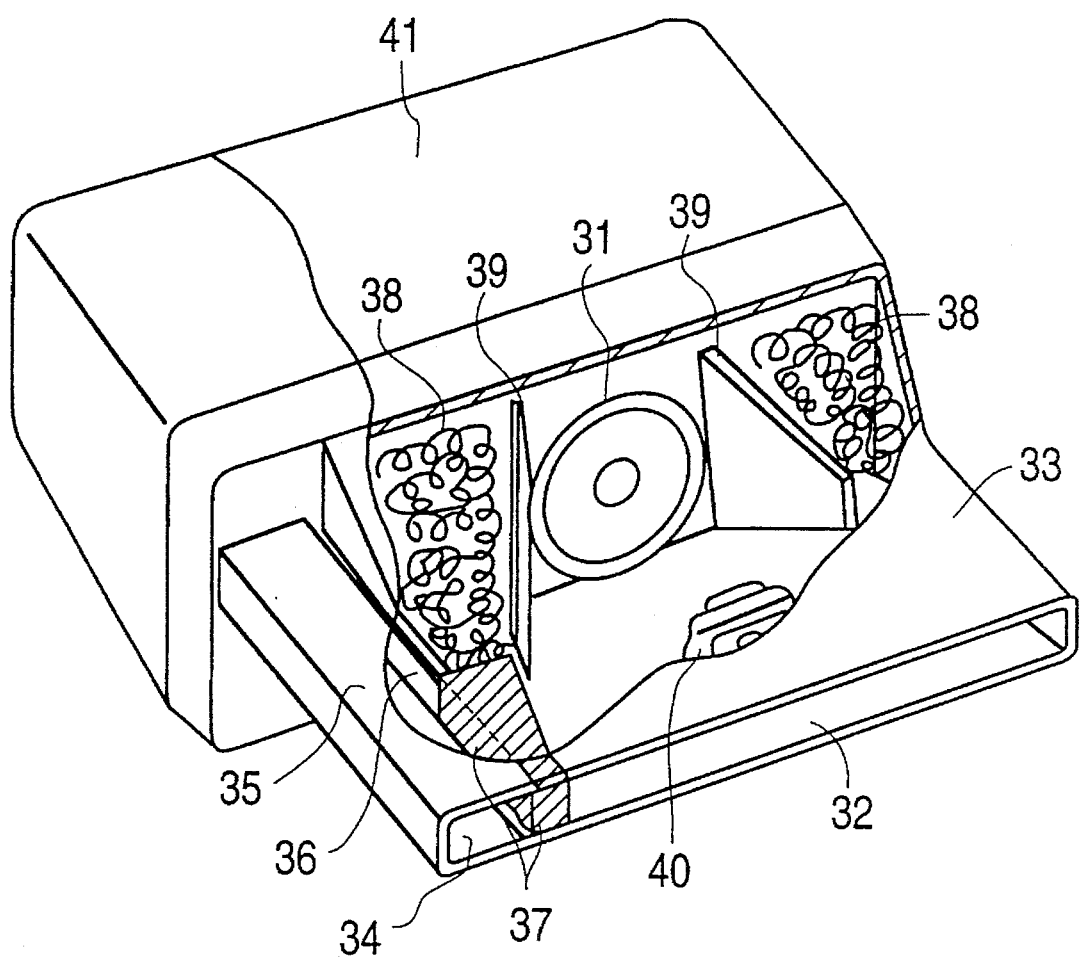
FIG. 3 is a perspective view of a television receiver incorporating a second embodiment of a speaker apparatus according to the invention.

Reference is made next to FIG. 3. This is a perspective view of a second embodiment of a speaker apparatus according to the invention.

In FIG. 3, at the front side of a speaker 31 for radiating sound waves, an acoustic pipe 33 having a slender and nearly rectangular opening 32 for guiding sound waves is disposed. A bass-reflex port 35 for enhancing the bass register having an opening 34 is disposed closely to one side of the rectangular side wall for composing the acoustic pipe 33. The acoustic pipe 33 and the bass-reflex port 35 for enhancing the bass register are coupled together by means of a wall 36 shared by the both, and a sound absorption material 37 for forming the remaining portion of the wall of the bass-reflex port 35 for enhancing the bass register. That is, at least part of the wall for composing the bass-reflex port is made of sound absurption material. Inside the acoustic pipe 33, a sound absorption material 38 is disposed, and a reflection plate 39 is also provided. A tweeter 40 for reproducing the treble register is provided in the sound wave passing route of the speaker 31.

Figure 4:
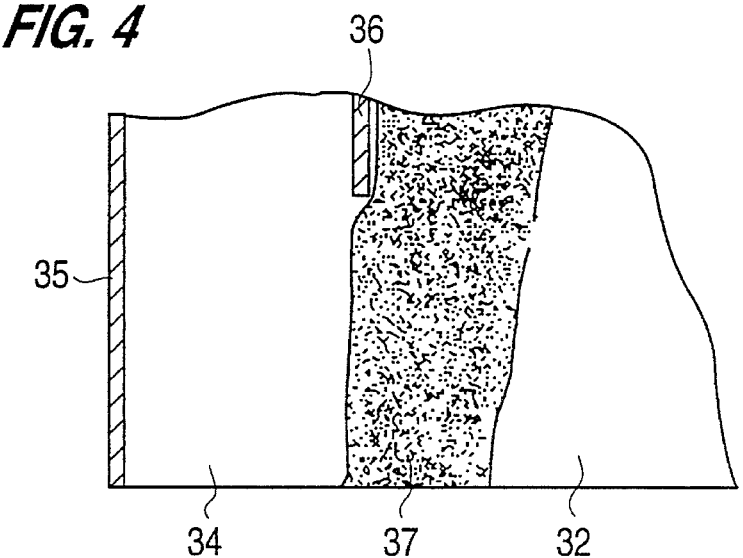
FIG. 4 is a magnified view around a bass-reflex port for enhancing the bass register in FIG. 3.

Refer to FIG. 4. This is a magnified view near the bass-reflex port 35 for enhancing the bass register shown in FIG. 3.

Figure 5:
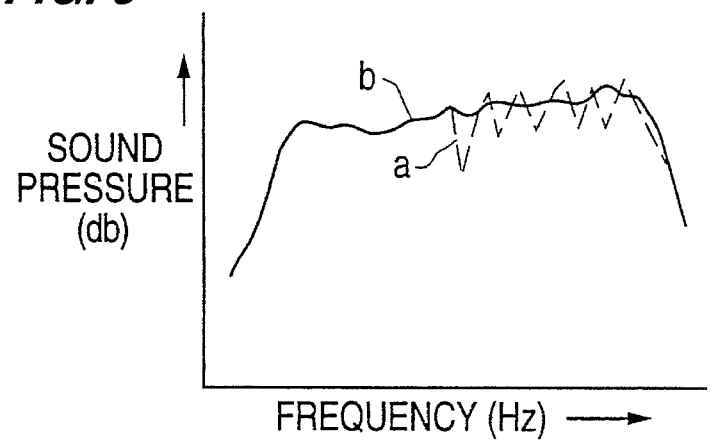
FIG. 5 is a comparative diagram of sound pressure and frequency characteristics of the second embodiment and the prior art.

Refer then to FIG. 5. This is a comparative diagram of the sound pressure and frequency characteristics of the second embodiment of the speaker apparatus of the invention and the speaker apparatus employing the conventional acoustic pipe, in which the characteristic curve a denotes the conventional speaker apparatus, and the characteristic curve b represents the invention. In both speaker apparatuses, the opening of the acoustic pipe is a slender rectangular form, and the opening of the bass-reflex port for enhancing the bass register is disposed closely to the opening of the acoustic pipe.

The sound waves radiated from the bass-reflex port for enhancing the bass register contain not only low frequency components but also medium and high frequency components. Since the phase relation with the medium and high frequency components radiated from the opening of the acoustic pipe is not constant, enhancing and canceling of the synthesized sound pressure of the both occur, and a sound pressure and frequency characteristic extreme in the difference between the peak and dip as indicated by characteristic curve a in FIG. 5 occurs.

In the second embodiment of the speaker apparatus of the invention, the sound absorption material 37 disposed near the front opening of the bass-reflex port 35 for enhancing the bass register acts to eliminate the stationary waves occurring inside the acoustic pipe 33, and absorb the medium and high frequency components radiated from the bass-reflex report for enhancing the bass register, and hence there is no interference to the medium and high frequency components radiated from the opening 32 of the acoustic pipe 33, so that a flat sound pressure-frequency characteristic as in characteristic curve b in FIG. 5 is obtained.

Besides, the sound absorption material 37 also acts to remove stationary waves inside the acoustic pipe 33, and therefore the more natural acoustic reproduction which was extremely difficult in the conventional apparatus is realized without attenuating the low frequency components radiated from the bass-reflex port 35 for enhancing the bass register.

In the second embodiment, incidentally, the bass-reflex port 35 for enhancing the bass register is composed of the same wall surface as the wall surface of the acoustic pipe 33, but same effects are obtained by composing to dispose the bass-reflex port 35 for enhancing the bass register closely to the acoustic pipe 33.

Also in the second embodiment, the bass-reflex port 35 for enhancing the bass register is disposed at one side of the acoustic pipe 33, but similar effects can be achieved when disposing the bass-reflex port 35 for enhancing the bass register at both sides of the acoustic pipe 33.

As described herein, in the speaker apparatus of the second embodiment and the television receiver using the same shown in FIG. 3, as clear from the drawing, the acoustic pipe having a nearly rectangular section for guiding the sound waves is disposed and part of the wall of the bass-reflex port for enhancing the bass register disposed closely to one side or both sides of the wall of the acoustic pipe by using a sound absorption material, so that the television receiver may be further reduced in size and thickness, while acoustic reproduction of high sound quality and high sound pressure is realized.

Figure 6:
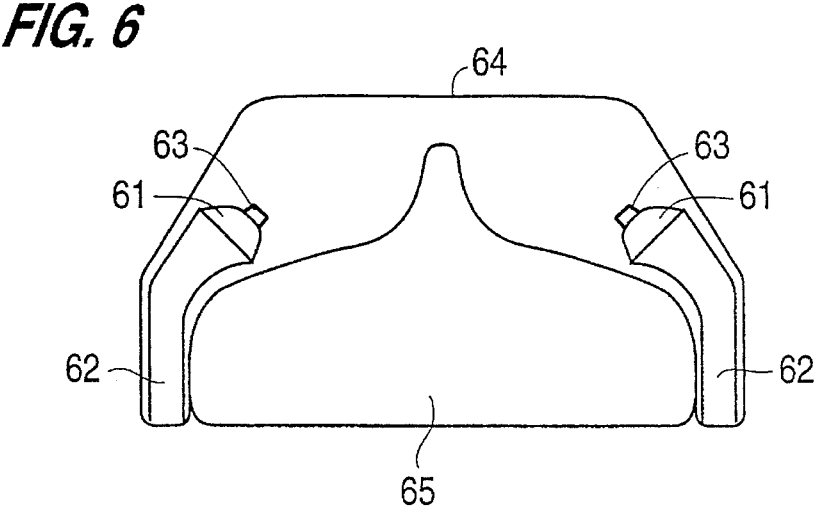
FIG. 6 is a plan sectional view of a television receiver incorporating a third embodiment of a speaker apparatus according to the invention.

Reference is made next to FIG. 6. This is a plan sectional view showing the outline of a television receiver incorporating a third embodiment of a speaker apparatus according to the invention.

In FIG. 6, at the front side of a speaker 61 for radiating sound waves, an acoustic pipe 62 having a slender and nearly rectangular opening for guiding sound waves is disposed. The speaker 61 has a magnetic circuit 63 which is an important element. The television receiver is represented by a cabinet 64 and a cathode-ray tube 65 for the sake of simplicity.

Figure 7:
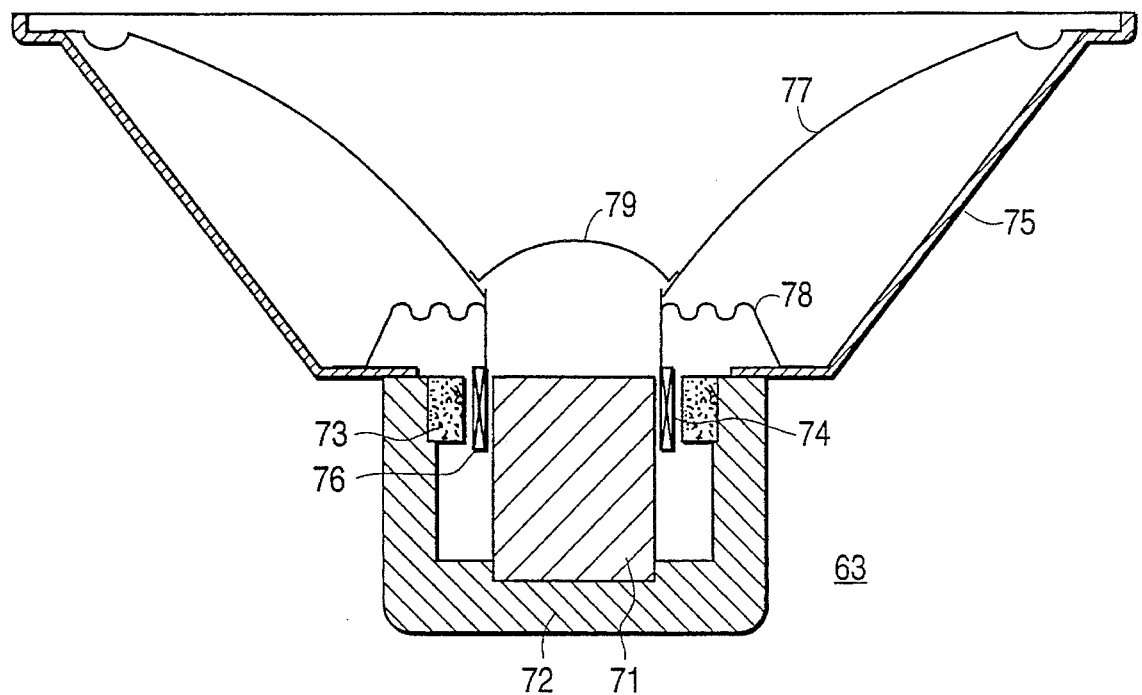
FIG. 7 is a sectional view showing the constitution of the speaker in FIG. 6.

FIG. 7 is a sectional view showing the construction of the speaker 61. In the diagram, the magnetic circuit 63 is composed of a columnar center pole 71, a plate 72 mounting the center pole 71 in the middle of the yoke of the bottom, a ring-shaped magnet 73 mounted at the inner side of the upper part of the plate 72, and a magnetic gap 74.

A frame 75 is fixed on the magnetic circuit 63, and in the open peripheral part of the frame 75 there is affixed the outer circumference of a diaphragm 77 having a voice coil 76 moving up and down without contact in the magnetic tape 74 coupled in the central part. The voice coil 76 is supported by a damper 78, and a dust cap 79 is adhered to the diaphragm 77 above the voice coil 76.

Figure 8:
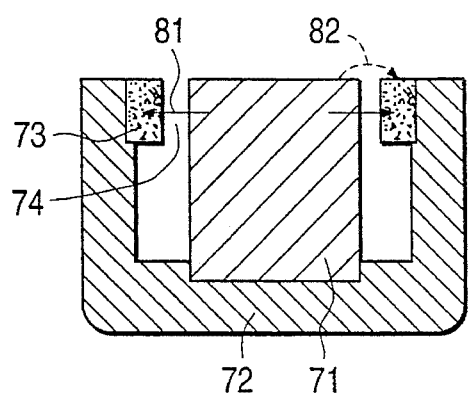
FIG. 8 is a sectional view of a magnetic circuit of the speaker in FIG. 7.

FIG. 8 is a sectional view of the magnetic circuit 63, showing the line of magnetic force of the magnet 73 magnetized in the radial direction, and a leakage magnetic flux 82. As clear from FIG. 8, in thus composed magnetic circuit 63, the line of magnetic force of the magnet 73 passes through the magnetic gap 74 while hardly escaping outside.

In this third embodiment, as shown in FIGS. 6 to 8, the speaker 61 is composed by forming the magnetic circuit 63 greatly reducing the leakage magnetic flux 82 by using the ring-shaped magnet 73, magnetized in the radial direction, and the acoustic pipe 62 having a slender opening and rectangular form for guiding the sound waves is coupled to the speaker 61, and is disposed closer to the cathode-ray tube 65 of the television receiver, and this is made possible by the fact that the effect of the leakage magnetic flux 82 from the magnetic circuit 63 on the cathode-ray tube 65 can be practically ignored. Therefore, by using the speaker apparatus according to the invention, the receiver is slimmer, and it is also possible to mount on a Hi-Vision receiver of an extended screen with a large aspect ratio, and Hi-Vision receiver of high sound quality and high grade can be presented.

Moreover, the constitution of the magnetic circuit 63 is simple, and the shield cover for prevention of leakage magnetic flux is not needed, thereby contributing to reduction of weight.

As the invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A speaker apparatus for use in a television receiver comprising a cathode-ray tube disposed in a cabinet, said speaker apparatus comprising:

a speaker for producing sound waves, said sound waves emanating from a front side of said speaker;

a first acoustic pipe having a substantially rectangular shape, and a first and second end, said first end of said first acoustic pipe disposed at said front side of said speaker, said second end of said first acoustic pipe formed so as to conform with the shape of a cavity formed by an outer wall of said cathode-ray tube and an inner wall of said cabinet;

a fitting rib disposed on said inner wall of said cabinet, said fitting rib engages said second end of said first acoustic pipe so as to secure said first acoustic pipe to said inner wall of said cabinet, wherein said rib enhances the rigidity of the cabinet and prevents propagation of sound waves along said inner wall of said cabinet;

a cushion material disposed between said second end of said first acoustic pipe and said outer wall of said cathode-ray tube, said cushion material prevents said first acoustic pipe from contacting said outer wall of said cathode-ray tube so as to prevent propagation of sound waves along said outer wall of said cathode-ray tube; and a second acoustic pipe formed by said cavity formed by said outer wall of said cathode-ray tube and said inner wall of said cabinet, said cavity extending from said second end of said first acoustic pipe to an opening in a front side of said cabinet.

2. A speaker apparatus according to claim 1, wherein said speaker further includes a magnetic circuit for generating a magnetic flux for moving a voice coil, said magnetic circuit comprising a ring-shaped permanent magnet which is magnetized in a radial direction.

3. A speaker apparatus according to claim 1, wherein said second acoustic pipe has a cross-sectional area which is larger than the cross-sectional area of said second end of said first acoustic pipe.

4. A speaker apparatus according to claim 1, further comprising a reflection plate disposed within said first acoustic pipe.

5. A speaker apparatus according to claim 1, further comprising sound absorbing material disposed within said first acoustic pipe.

6. A speaker apparatus for use in a television receiver comprising a cathode-ray tube disposed in a cabinet, said speaker apparatus comprising:

a speaker for producing sound waves, said sound waves emanating from a front side of said speaker;

an acoustic pipe having a substantially rectangular shape, and a first and second end, said first end of said acoustic pipe disposed at said front side of said speaker; and sound absorption materials and sound reflecting plates arranged at an inner side of the acoustic pipe;

at least one base-reflex port for enhancing the base register, said base-reflex port having a substantially rectangular shape and a first and second end, said base reflex port formed adjacent said acoustic pipe such that said base reflex port and said acoustic pipe are separated by a single wall comprising a sound absorption material, said single wall is common to both said base-reflex port and said acoustic pipe; and a sum of the second end of the acoustic pipe and the second end of said base reflex port comprising an opening formed so as to conform with the shape of a cavity formed by an outer wall of said cathode-ray tube and an inner wall of said cabinet.

7. A speaker apparatus according to claim 6, wherein said speaker further includes a magnetic circuit for generating a magnetic flux for moving a voice coil, said magnetic circuit comprising a ring-shaped permanent magnet which is magnetized in a radial direction.

8. A speaker apparatus according to claim 6, wherein a portion of said single wall common to both said base-reflex port and said acoustic pipe comprising said sound absorption material is disposed adjacent said second end of said acoustic pipe and said base-reflex port.

* * * * *